Patented May 16, 1933

1,909,381

UNITED STATES PATENT OFFICE

WILLIAM L. TENNANT, OF SAN FRANCISCO, CALIFORNIA, ASSIGNOR TO JESSIE H. TENNANT, OF SAN FRANCISCO, CALIFORNIA

INCENSE

No Drawing. Application filed August 31, 1931. Serial No. 560,505.

This invention relates to incense and has for its objects an improved incense composition which will better retain the volatile aromatic compounds, will possess a much better controlled burning quality than former compounds, and also a composition in which the carrying body material itself contributes very largely to the desirable odors instead of contaminating it as with other incense compounds.

Incense is, as is well known, composed of combustible body material impregnated with various aromatic agents, generally of a volatile nature so as to be carried out into the room with the products of slow combustion when the material is ignited.

In experimenting with various incense compounds I found that there was a considerable loss of the more volatile aromatics over a lapsed time which greatly diminished the value of the product, and I attributed this to the inability of the carrier matter to retain the volatiles which constantly escape as gases. I also noted the fact of contamination of the desired odor with what might be termed a mere smoky odor of the slow combustion and in seeking to improve these faults I tried many materials and finally discovered that an incense body made of a powder from that part of the bark of the California redwood tree (Sequoia washingtoniana or Sequoia sempervirens) which lies between the cambium and the epidermis, had an adsorbent property which retained the volatiles with practically no loss over an extended period of time, yet emitted the odors gradually during the smolder action of the burning incense, and besides this, was not only free from the disagreeable combustion products mentioned but on the contrary yielded up a pleasant odor characteristic of the redwood tree itself and probably due to the natural gums and resins contained in the material. The remarkable adsorbing power of the powder is probably due to the extremely porous nature of the bark and which also contributes toward its unusual even burning quality.

This bark is readily obtainable in pieces from 6 inches to 12 inches in thickness, and in making an incense with this bark as a body material I use, the inner layers, or as stated, that part which lies between the cambium and the epidermis (the latter sometimes running several inches thick) and I reduce it to a fine powder or flour by any suitable comminuting and powdering mill. This fine powder is then mixed with any desired aromatic compounds, also a suitable binder, preferably water resistant and molded into the desired shapes for use. A very small percentage of saltpetre may also be added to increase the smoldering rate.

As an example of an incense made up with my improved body material the following formula will serve:

| | Percent by weight |
|---|---|
| Redwood bark flour | 50.05 |
| Gum benzoin, powdered | 9.90 |
| Gum acacia, powdered | 16.50 |
| Aromatic materials such as orris root, yara yara, rose leaves, vetvert, coumarin, etc., about | 22.34 |
| Bergamot, oak moss, or other alcoholic extracts | .55 |
| Saltpetre | .66 |
| | 100. |

With the above is then incorporated about two liquid ounces of any perfume, or aromatic distillation carried in alcohol, even such as the alcoholic extract of the young parts, tendrils and leaves, of the redwood tree together with just enough water to work the mass up into a stiff paste suitable for spreading into molds for drying to produce the shape of incense blocks or lumps desired.

The presence of both alcohol and water in the mass insures dissolving of both binding agents, benzoin and acacia, and the two together form a water resisting binder which aids in locking the volatiles within the interstices of the redwood bark flour.

The odor of the incense may of course be varied to suit by incorporating other or additional aromatics.

Having thus described my invention consisting of an improved incense material, I claim:—

1. An incense containing as a body material the bark of the California redwood in finely divided form held together with a binder.

2. An incense containing aromatics adsorbed into the pores of the bark of the California redwood.

3. An incense containing aromatics mixed with about 50% of the bark of the California redwood and held in compact form by an alcohol soluble binder.

4. An incense containing aromatics mixed with about 50% of the bark of the California redwood and held in compact form by both an alcohol and a water soluble binder.

5. An incense containing as a body material the bark of the California redwood and a relatively small percentage of a combustion promoting agent.

WILLIAM L. TENNANT.